(12) United States Patent
Jones, III (10) Patent No.: US 11,868,171 B2
(45) Date of Patent: Jan. 9, 2024

(54) EXTERNAL WIRELESS DEVICE CONVERTER

(71) Applicant: T-Mobile USA, Inc., Bellevue, WA (US)

(72) Inventor: Anthony Samuel Jones, III, Kent, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 105 days.

(21) Appl. No.: 17/100,755

(22) Filed: Nov. 20, 2020

(65) Prior Publication Data

US 2022/0163993 A1 May 26, 2022

(51) Int. Cl.
*H04B 1/38* (2015.01)
*G06F 1/04* (2006.01)
*H04W 60/00* (2009.01)

(52) U.S. Cl.
CPC .............. *G06F 1/04* (2013.01); *H04W 60/00* (2013.01)

(58) Field of Classification Search
CPC ....... H04W 60/00; H04W 4/02; H04W 4/029; H04W 4/024; H04L 12/2807; H04L 41/20; H04L 41/26; H04L 43/0811; H04L 41/22; H04M 1/0214; H04M 1/271; H04M 1/72403; H04M 1/72415; H04M 1/72427; H04B 1/3833; G06F 1/04
See application file for complete search history.

(56) References Cited

U.S. PATENT DOCUMENTS

| | | | | | |
|---|---|---|---|---|---|
| 4,701,946 | A | * | 10/1987 | Oliva | H04M 11/007 379/102.04 |
| 5,059,141 | A | * | 10/1991 | Scott | H01R 27/02 379/442 |
| 5,457,601 | A | * | 10/1995 | Georgopulos | G06K 19/07739 361/728 |
| 5,505,633 | A | * | 4/1996 | Broadbent | H05K 5/0273 439/946 |
| 5,511,069 | A | * | 4/1996 | England | H04L 5/1415 375/220 |
| 5,689,821 | A | * | 11/1997 | Shimazaki | H01Q 9/14 343/702 |
| 5,809,520 | A | * | 9/1998 | Edwards | G11B 23/0317 369/231 |
| 5,855,483 | A | * | 1/1999 | Collins | A63F 13/245 434/307 R |
| 5,930,719 | A | * | 7/1999 | Babitch | H04M 1/725 455/462 |
| 6,058,433 | A | * | 5/2000 | Gilbert | H04L 9/40 370/468 |
| 6,059,583 | A | * | 5/2000 | Croft | H01R 35/02 439/131 |

(Continued)

Primary Examiner — Stephen M D Agosta
(74) Attorney, Agent, or Firm — Lee & Hayes, P.C.

(57) ABSTRACT

Aspects of the invention include a converter device having at least the following: a housing including a button with a motor and a gear assembly, a wireless processor, an internal battery, and an attachment element to attach the housing to a host device. The button may be programmable to control the host device. In addition, the wireless processor is pre-configured with a specific identifier (e.g., SIM) to a mobile network or a user's mobile device so that upon activating the host device, the converter may be connected to the mobile network or the user's mobile device without any additional configurations.

8 Claims, 8 Drawing Sheets

(56) References Cited

U.S. PATENT DOCUMENTS

| | | | |
|---|---|---|---|
| 6,259,726 B1* | 7/2001 | Saadeh | H04M 1/733 379/90.01 |
| 6,377,982 B1* | 4/2002 | Rai | H04L 69/168 709/217 |
| 6,525,711 B1* | 2/2003 | Shaw | G06F 3/016 345/158 |
| 6,526,288 B1* | 2/2003 | Khalifa | H04W 76/10 455/559 |
| 6,529,743 B1* | 3/2003 | Thompson | H04W 88/02 455/556.1 |
| 6,717,801 B1* | 4/2004 | Castell | H04M 1/0254 361/679.41 |
| 6,961,798 B2* | 11/2005 | Ferguson | G06F 3/038 710/63 |
| 7,110,789 B1* | 9/2006 | Curtiss | H04M 1/04 379/435 |
| 7,433,712 B2* | 10/2008 | Moran | H04M 1/72409 455/565 |
| 7,549,007 B1* | 6/2009 | Smith | G06F 1/1656 455/418 |
| 7,555,313 B2* | 6/2009 | Vaananen | H04M 1/72412 455/552.1 |
| 7,676,584 B2* | 3/2010 | Klitsner | A63F 13/30 709/227 |
| 7,974,656 B2* | 7/2011 | Hara | H04M 1/72409 709/200 |
| 8,325,107 B2* | 12/2012 | Christison | G09G 5/006 345/2.3 |
| 8,504,772 B2* | 8/2013 | Tan | H04N 23/00 711/115 |
| 9,282,582 B1* | 3/2016 | Dunsbergen | H04W 48/12 |
| 2001/0034245 A1* | 10/2001 | Swartz | H04M 1/72412 455/222 |
| 2002/0013162 A1* | 1/2002 | Whitney | H04W 88/02 455/557 |
| 2002/0022473 A1* | 2/2002 | Takagi | H04M 1/656 455/564 |
| 2002/0042256 A1* | 4/2002 | Baldwin | H03L 7/085 455/323 |
| 2002/0075816 A1* | 6/2002 | Beckwith | H04W 92/18 370/278 |
| 2002/0082047 A1* | 6/2002 | Souissi | H04L 27/0008 455/456.1 |
| 2002/0083432 A1* | 6/2002 | Souissi | H04B 1/0003 717/178 |
| 2002/0151328 A1* | 10/2002 | Shin | G06F 1/1637 455/557 |
| 2002/0151329 A1* | 10/2002 | Prince | H04M 1/725 455/557 |
| 2002/0160792 A1* | 10/2002 | Maki | H04M 1/725 455/462 |
| 2003/0040222 A1* | 2/2003 | Price | H01R 27/02 439/638 |
| 2003/0100264 A1* | 5/2003 | Schroeder | G06F 1/1601 455/66.1 |
| 2003/0179815 A1* | 9/2003 | Kandiar | H03F 3/26 375/219 |
| 2004/0029613 A1* | 2/2004 | Kitazumi | H04B 10/11 455/557 |
| 2004/0053616 A1* | 3/2004 | Overtoom | H04W 40/02 455/445 |
| 2004/0125782 A1* | 7/2004 | Chang | H04W 12/02 370/338 |
| 2004/0127254 A1* | 7/2004 | Chang | G06F 8/61 455/557 |
| 2004/0166908 A1* | 8/2004 | McInnis | H01Q 1/36 455/575.7 |
| 2004/0204091 A1* | 10/2004 | Liu | G06F 1/3215 455/552.1 |
| 2004/0264406 A1* | 12/2004 | Pattenden | H04L 69/164 370/328 |
| 2005/0020257 A1* | 1/2005 | Davis | H04M 1/2155 455/426.1 |
| 2005/0179565 A1* | 8/2005 | Mase | G09B 21/007 341/27 |
| 2005/0201540 A1* | 9/2005 | Rampey | H04M 15/06 379/142.14 |
| 2006/0104238 A1* | 5/2006 | Hibino | H04W 8/20 370/328 |
| 2007/0244611 A1* | 10/2007 | Brozovich | G07C 5/008 701/31.5 |
| 2008/0084897 A1* | 4/2008 | Na | G06F 13/105 370/493 |
| 2008/0143611 A1* | 6/2008 | Wang | H01Q 1/243 343/702 |
| 2009/0052338 A1* | 2/2009 | Kelley | H04L 43/16 370/250 |
| 2009/0055514 A1* | 2/2009 | Tebbs | H04L 41/0806 709/220 |
| 2009/0228608 A1* | 9/2009 | Nysen | H05K 9/0056 710/1 |
| 2009/0239470 A1* | 9/2009 | Sherman | H04W 4/80 381/361 |
| 2010/0216465 A1* | 8/2010 | Mubarek | H04W 48/18 370/310 |
| 2010/0290390 A1* | 11/2010 | Souissi | H04W 12/06 370/328 |
| 2010/0321877 A1* | 12/2010 | Moser | G06F 1/1654 361/679.29 |
| 2011/0032186 A1* | 2/2011 | Genesin | G06F 3/0338 345/161 |
| 2011/0256905 A1* | 10/2011 | Ryan | H04M 1/72409 455/556.1 |
| 2013/0093683 A1* | 4/2013 | Hu | G06F 3/1454 345/169 |
| 2014/0315642 A1* | 10/2014 | Grant | A63F 13/285 345/184 |
| 2015/0341852 A1* | 11/2015 | Knudsen | H04W 48/18 455/432.1 |
| 2018/0176976 A1* | 6/2018 | Liu | H04W 76/18 |
| 2019/0045296 A1* | 2/2019 | Ralph | B06B 1/06 |
| 2022/0232938 A1* | 7/2022 | Poon | A45C 11/00 |

* cited by examiner

| HOST DEVICE: TIMER 522 |
|---|
| USAGE:<br>HOURS: 10<br>LAST ACTIVATED: 10:25 AM; 2020-09-10<br>LAST UPDATE: 8:05 AM; 2020-09-11<br>WIRELESS SIGNAL STRENGTH: GOOD     524 |
| ALERT:<br>BATTERY LEVEL: 25% -- CONSIDER CHARGING     526 |
| ERRORS:<br>CHARGING ERROR: 7:15 AM; 2020-09-11<br>ACTIVATION ERROR: 5:45 PM; 2020-09-07     528 |
| ... |

EXTERNAL WIRELESS DEVICE CONVERTER

TECHNICAL FIELD

The present application is generally related to wireless devices. More specifically, aspects of the invention relate to adding wireless capabilities to devices that do not have wireless capabilities.

BACKGROUND

Devices with a wireless connectivity have provided additional flexibility and interoperability for the devices. However, many existing analog devices do not have wireless capabilities. As a result, users may need to replace existing devices with a new one. Unfortunately, even some of the newer ones, even though they may be digital, still fail to have the necessary wireless capabilities.

Moreover, some of the existing approaches require an input/output connection, such as a USB connection. However, many of the devices do not have an USB port.

Therefore, a novel and nonobvious technical solution is needed to overcome the shortcomings of existing challenges.

SUMMARY

Aspects of the invention include a system or an apparatus that may include a motor and a gear assembly to identify or configure a button. In addition, the system or apparatus may further include a wireless processor, a memory, and a network port for connecting with other wireless devices.

BRIEF DESCRIPTION OF DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
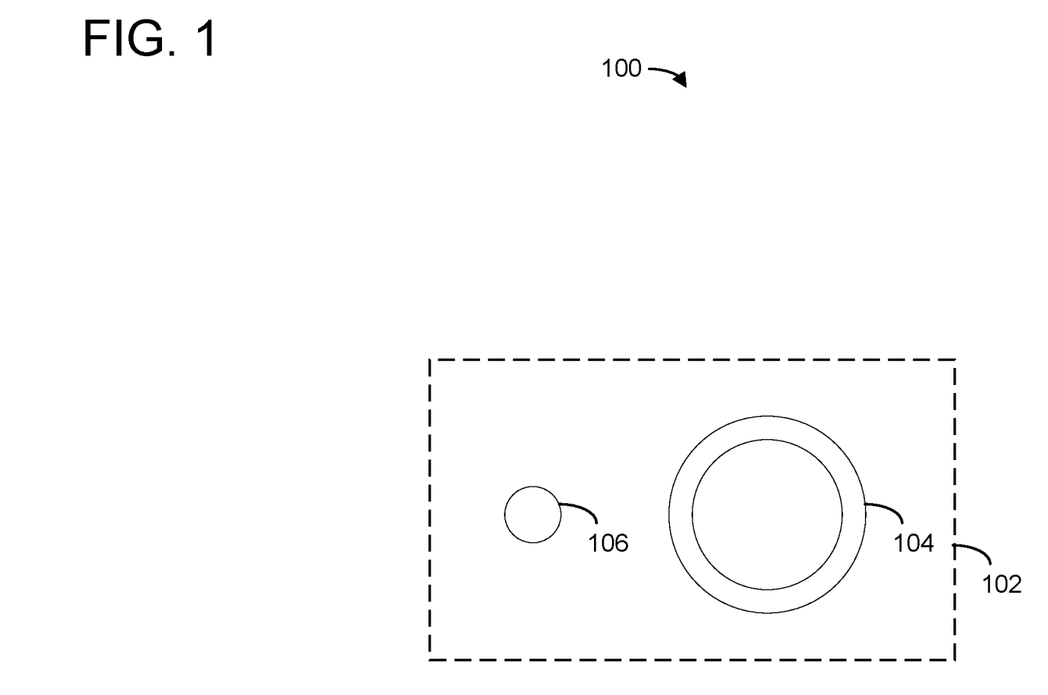
FIGS. 1 to 3 illustrate an external wireless device converter according to some embodiments.
Figure 2:
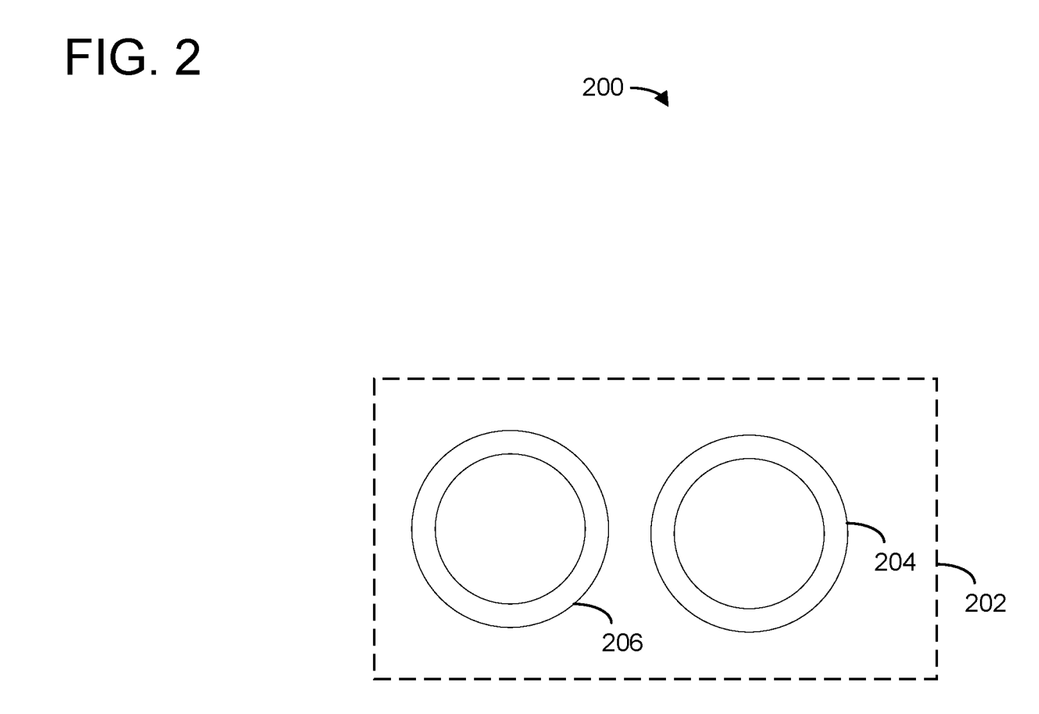
Figure 3:
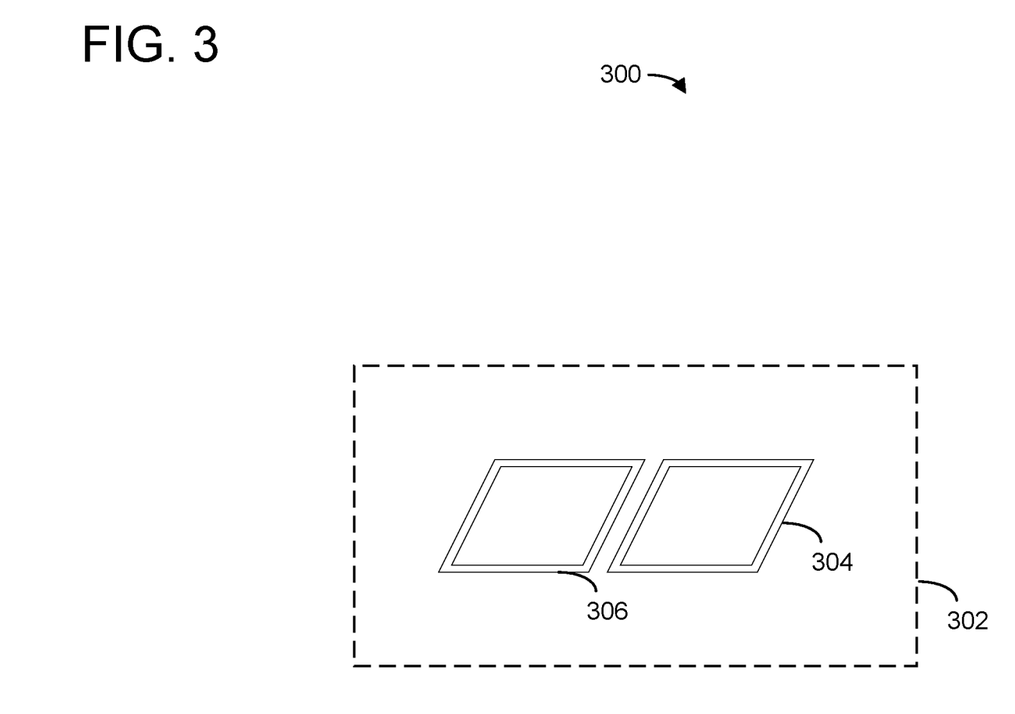

Referring now to FIGS. 1-3, an external wireless device converter is illustrated according to some embodiments. In some embodiments, a top view of a converter 100 may be illustrated. In one example, the converter 100 may include a housing 102, a button 104, and an indicia 106. In one example, the button 104 may be a press down button. In some embodiments, the button 104 may include a gear assembly, to be further described in FIG. 4. In yet some embodiments, the button may include a motor, to be described in FIG. 4, connected or engaged with the gear assembly so that the movement of the button 104 may be actuated. In some embodiments, the indicia 106 may indicate one or more states of the converter 100. For example, the indicia 106 may be include a light indicator. The light indicator may indicate a first state that the wireless capability of a host device is activated/energized. The light indicator may indicate a second state that the wireless capability of the host device is deactivated or de-energized. In one example, the light indicator may use a number of blinks or a duration of the blinks to differentiate the different states. In some embodiments, the indicia 106 may further use audio indication to identify the different states. In yet some other embodiments, the button 104 may be a touch sensitive button that may be coupled with a tactile or vibration motor that may alert the user in response to activating the button 104.

Referring now to FIG. 2, a converter 200 may include two circular shaped buttons 204 and 206. FIG. 3 illustrates a converter 300 may include two buttons 304 and 306 that may be in a parallelogram. It is to be understood that various shapes of the button 104, 204, 206, 304, or 306 may be used without departing from the scope or spirit of the invention. In yet some embodiments, a toggle switch, a slider switch or other types of button may be used without departing from the scope or spirit of the invention.

Figure 4:
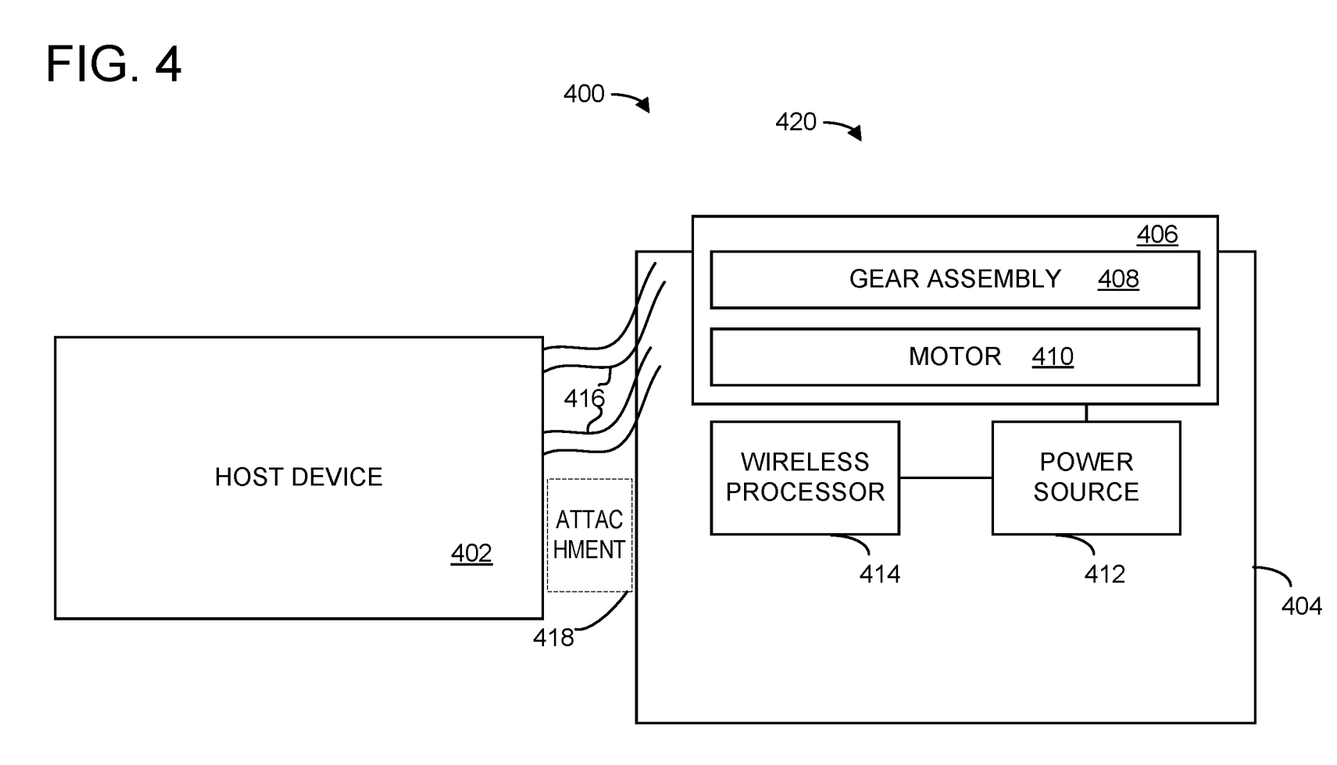
FIG. 4 illustrates a system of an external wireless device converter according to some embodiments.

Referring now to FIG. 4, a cross-section view of a system 400 having an external wireless converter 420 according to some embodiments. For example, a host device 402 does not have wireless capability and is inconvenient to the user. In some embodiments, the host device 402 may be an analog timer and it does not have a power source. As such, the power is provided when the timer is plugged to the alternate current socket. However, the user could not use a digital wireless device, such as a personal computing device 801 in FIG. 6, to control or use the timer. As such, the external wireless converter 402 may be used.

In some embodiments, the external wireless converter 420 may include a housing 404 and a power connector 416. The power connector 416 may connect to a plug or power input of the host device 402. In another example, the converter 420 may further include a power source 412, such as an internal battery. In one example, the power source 412 may be a rechargeable battery so that the power source 412 may be recharged when plugged to the wall socket.

In some embodiments, the power source 412 may also provide electrical energy to a wireless processor 414 that may provide processing capability to program indications from the button 406 and broadcast the indications wirelessly. In one example, the wireless processor 414 may be part of a printed circuit board (PCB) and the wireless processor 414 may include a variety of wireless bandwidth capability. For example, the wireless bandwidth capability may include WI-FI, BLUETOOTH, NFC, and other mobile cellular technologies, such as 3G, LTE, 5G, etc.

In practice, using the timer host device 402 as an example, a user may connect the power connector 416 to the host device 402. The user may activate the converter 420 by pressing the button 406. As discussed above, the button may be programmed with the wireless processor 414, such as one press means to activate while two presses mean to deactivate. In another example, one long press may be to delay activation. Therefore, the wireless processor 414 may program the host device 402 in response to the button 406 activations.

Figure 6:
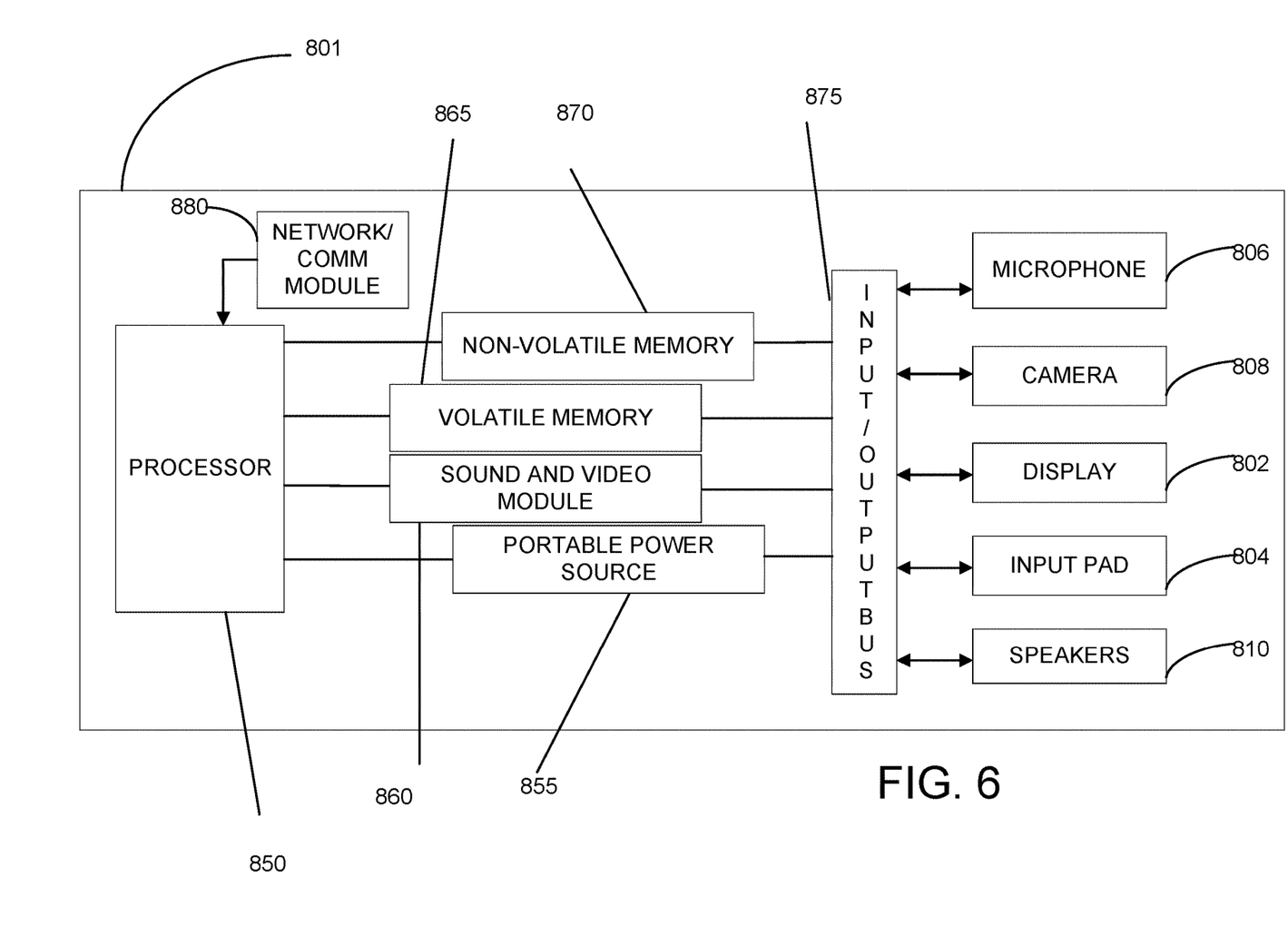
FIG. 6 is a diagram illustrating a portable computing device according to one embodiment.
Figure 7:
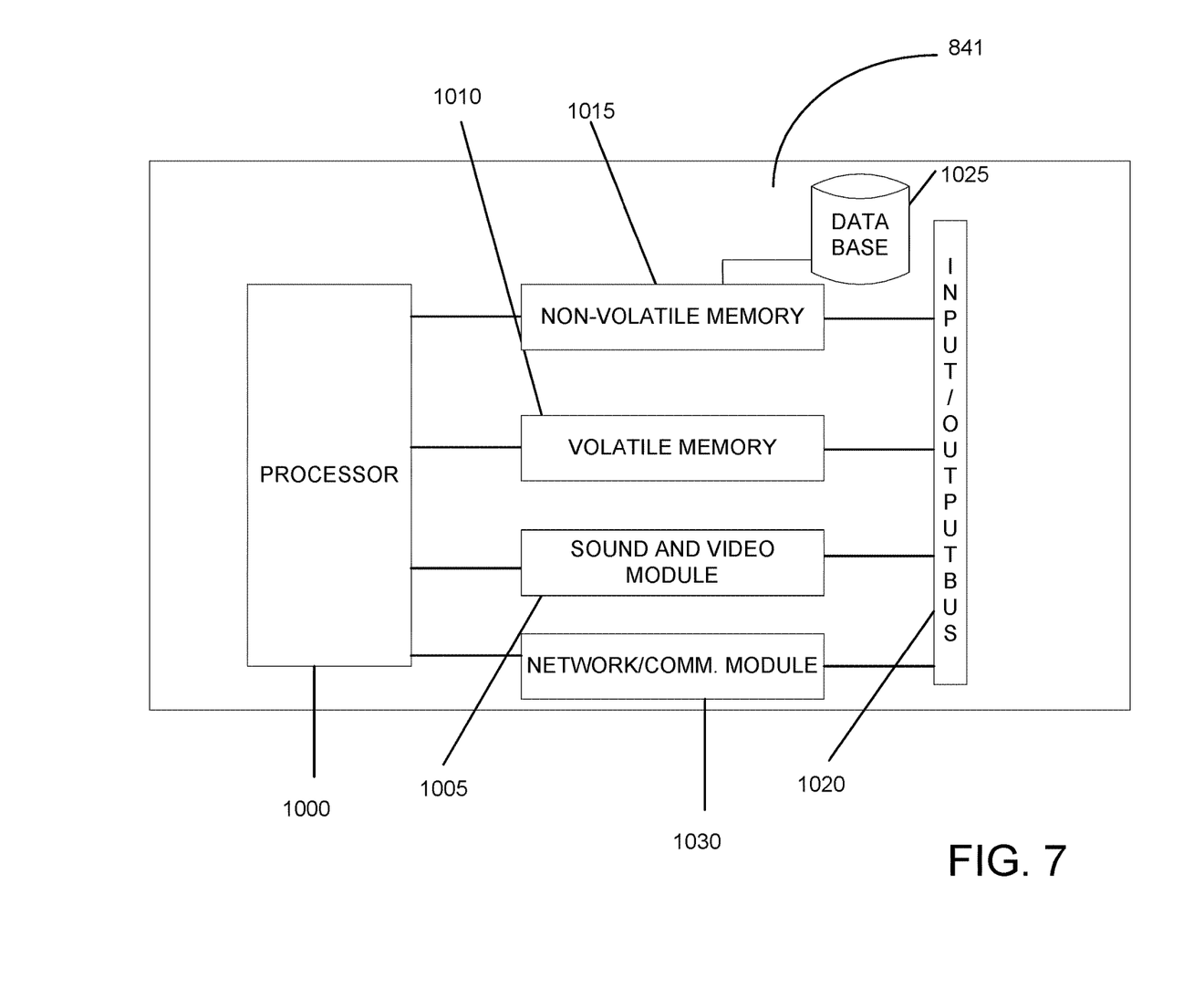
FIG. 7 is a diagram illustrating a computing device according to one embodiment.

Once the wireless processor 414 is activated, the wireless processor 414 may transmit the programmed data to another device, such as the personal computing device 801 in FIG. 6 or the device 841 in FIG. 7. In yet another embodiments, the wireless processor 414 may include a preconfigured subscriber identification module (SIM) to enable the wireless processor 414 to wireless connect to a cellular network. Logically, only authorized users may access a cellular network and a SIM may be used to authorize users to access the cellular network. The SIM may be different than a traditional SIM in that the SIM may not support voice communication but my support limited data communication. Related, there may be a limit on the number of voice communication numbers and by using extensions or prefixes, additional fields, flags, markers, etc., the number of voice numbers necessary may be limited. On the cellular network or the personal computing device 801 or the device 841, a corresponding application or application programming interface (API) may be used to receive the programmed information so that the user may wireless configure the host device 402.

Using cellular data may allow more people to using wireless communication to monitor host devices 420. Not all people have internet access or an available Bluetooth connection but more people may have cellular communication access. By using cellular communication access, more people may be able to control host device 420 wirelessly and directly.

In some embodiments, the converter 420 may further include an attachment 418 to attach the converter 420 to the host device 402. For example, the attachment 418 may be a magnet, clip, hook and loop fastener, an adhesive, or the like.

Figure 5A:
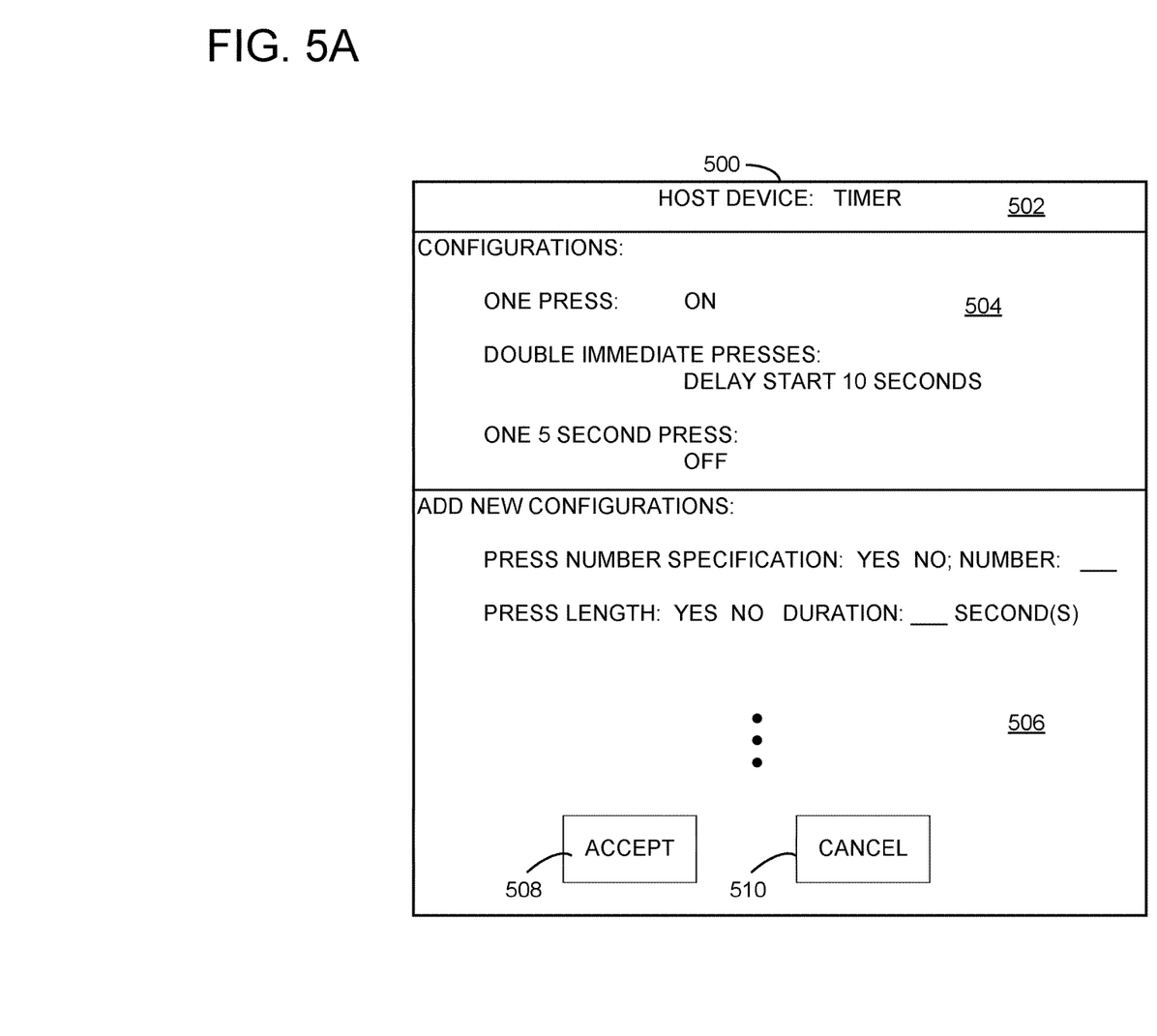
FIG. 5A illustrates an exemplary user interface to configure a host device according to some embodiments.

Referring now to FIG. 5, an exemplary user interface 500 may be provided to the user on the portable computing device according to some embodiments. The user interface 500 may first identify the host device 402. In this example, the host device 402 may be an analog timer. In some embodiments, the user may be able to name the host device 402 as there may be multiple host devices 402 attached to additional convertors 420 and the user may be able to name and control a plurality of host device 402 to keep the plurality of host devices 402 from being confused. In other embodiments, the host device 402 may be able to communicate naming information to the convertor 420. In yet another embodiments, with the naming information and other information associated with the plurality of host devices 402, the convertor 420 may create a profile for each of the host devices 402. In some embodiments, the converter 420 may have access to past profiles of host devices 402 and may be able to suggest names to user or to the converter 420 based on the usage profile of the host device 402 in comparison to known devices. In this example, the wireless processor 414 may wirelessly transmit the programmed data to the user interface 500 and the programmed data may be displayed in a first pane 504. The data may include:

One press;
Double immediate presses;
One five second press.

It is to be understood that other programmed data may be provided without departing from the scope or spirit of the invention.

In some embodiments, the user interface 500 may include a second pane 506 to enable to add new configurations. For example, various options or settings may include:

Press number specification;
Press length and durations.

It is to be understood that other options or settings may be included without departing from the scope or spirit of the invention.

The user interface 500 may further include an "Accept" button 508 or a "Cancel" button 510 to either accept the new configurations or cancel the new configurations. Logically, other options may be available such as naming the host device 402, reviewing power usage by the host device 402, graphing usage over time, querying usage over time, etc. The user interface may be modified by a user. For example, certain tasks may more important to a first user than tasks available to a second user and the user interface may be modified to reflect priorities of each user.

In one embodiment, the wireless processor 414 may connect the host device to the mobile or cellular network. As such, the user interface 500 may be available through a web portal of the user who has an account associated with the mobile or cellular network.

Figure 5B:
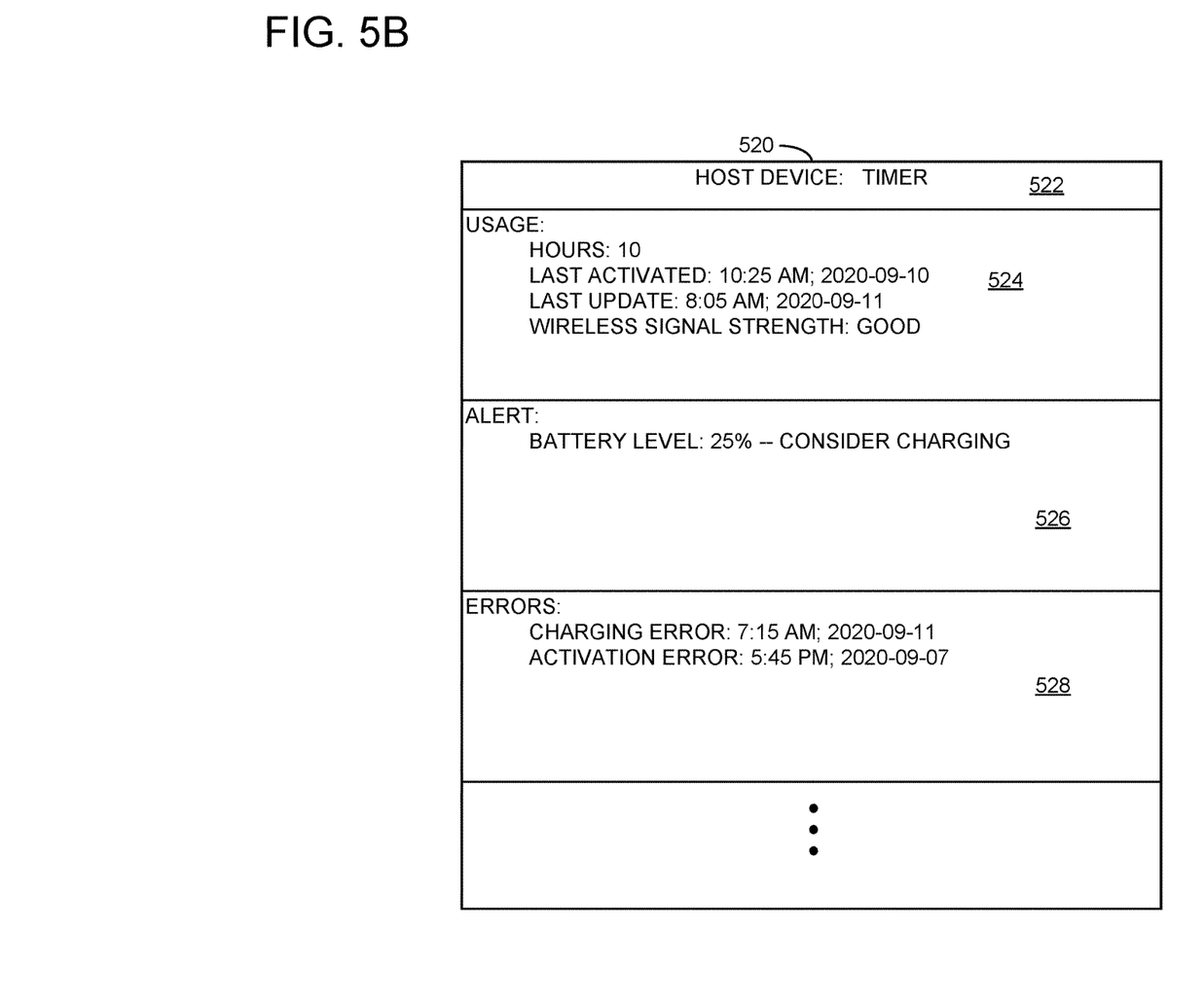
FIG. 5B illustrates another user interface to configure a host device according to some embodiments.

Referring now to FIG. 5B, another user interface 520 may be used to configure the host device aspects of the invention. In one embodiment, the wireless processor 414 may include elements of a preconfigured or an electronic SIM (eSIM) so that, upon activation or energizing of the wireless processor 414, the wireless processor 414 may send data of the host device 402 to the mobile carrier or network. For example, in addition to the user interface 500 shown in FIG. 5A, the user interface 520 may provide various information of the host device 402. For example, the wireless processor 414 may include programming instructions built-in that may monitor, track, and record usage of the host device 402. Such usage data is stored in a memory device (not shown), that may be separate from that of a built-in memory on the wireless processor 414 or may be part of the built-in memory.

In addition, as the converter 420 may include the power source 412 that may be portable, the transmission of the data such as the usage data may not be transmitted on demand (e.g., "push" model). To conserve power consumption, the transmission of the data may be a function of one or more of the following: wireless signal strength, power usage of the power source 412, an amount of the data to be transmitted, and any other external power source or supply.

For example, the wireless processor 414 may include algorithms that record various usage information (e.g., length of use, time of use, number of programming resets, power consumption, instructions from the user via the user interface 400, etc.). The algorithms may further include configurations to determine when certain set of data is to be sent wirelessly. For example, the algorithms may set a threshold of data size or a threshold where an exception or a fault occurred. As such, the wireless processor 414 may be activated to send the data to the mobile network and the mobile network server (e.g., 841 in FIG. 7) may further provide the information on the user interface 520. For example, the user interface 520 may include one or more information panes 524, 526 and 528. Each of these panes may provide discrete set of information or data to the user, either via a web portal or via an app installed on a mobile device.

In another embodiment, the converter 420 may include a removable tray for the user to insert a SIM card so that the wireless processor 414 may read and transmit data to a mobile account according to the SIM card.

In yet some embodiments, the mobile network server that may receive the data may employ artificial intelligence (AI) algorithms to conduct additional analysis of the raw data received. The additional analysis information may further be provided in the user interface 520.

As the host device 402 may be in communication with the convertor 420, a variety of options may be available. A user may be able to monitor the power usage of the host device 402. This power usage knowledge may be pushed to the user periodically or according to a schedule or may be pulled or requested by the user when desired. Additional data may also be collected and may be pushed or pulled as desired. For example, the additional data may include power usage, time of power usage, length of power usage, name of host device 402, type of host device 402, etc. The data may be stored, analyzed and be available for future review. The convertor 420 may allow additional flexibility now that power to the host device 420 is wirelessly controlled by the converter 420. In a simple example, the host device 420 may now be turned on and off remotely using wireless communication which may be a cellular communication. The host device 420 may be subject to a timer which may control the power to the host device 420. The host device 420 may be monitored and may be turned on and off based on conditions. For example, if the host device is demanding more power than usual which may indicate a fault, wireless communication may be used to turn off. Further, the fault may be communicated to the user. Similarly, if the host device 420 stops using power, a presumption may be made that the host device 420 may be broken and should be checked. Further, a notice may be communicated to a user or to a host device 420 manufacturer.

In yet a further embodiment, the converter 420 may also act as an internet source for other nearby devices. As the converter 420 may by in communication with the cellular network, it may have access to the internet. The access may be shared through a wired connection or through a wireless connection such as through Bluetooth, WiFi, NFC, eSIM, any other appropriate wireless connection, or a combination of the wireless communication. Logically, the device may track internet usage and may allow the wireless connection to be managed through a user interface. For example, some devices may be limited to internet access during a certain period of time. Logically, other embodiments of the converter 420 may include a speaker which may use the cellular connection to obtain music of podcasts or the convertor 420 may be adapted to obtain and stream visual programs such as movies from online sources.

FIG. 6 may be a high level illustration of a portable computing device 801 communicating with a remote computing device 841 in FIG. 7 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 6 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may use the APIs to gather information in a known format to make better informed and more efficient decisions. The system is more than just speeding a process but uses a computing system to achieve a better outcome.

The physical elements that make up the remote computing device 841 may be further illustrated in FIG. 7. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the external wireless converter overcomes challenges of existing approaches. Existing approaches require connections such as universal serial bus (USB) connection before connecting to a host device. However, the host device usually does not include such USB connection. Aspects of the invention may provide a button, a gear assembly, a motor, a power source, and a wireless processor to connect to a host device so that the host device may have wireless capability.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A wireless converter for converting a host device to a wireless-capable device comprising:
    a housing, wherein the housing is external to and separate from the host device;
    a button having a connection and an actuating assembly for the button, said connection being configured to connect to a switch of the host device, said button having an outer surface to user interaction, wherein the actuating assembly is disposed inside the housing and comprises a motor and a gear assembly, wherein the actuating assembly is further connected to an energy source, wherein the motor actuates movements of the button;
    a wireless processor, being within the housing and being external to the host device, having a wireless antenna for a mobile cellular network and being preconfigured with a preset wireless identifier for registering with the mobile cellular network, wherein the preset wireless identifier comprises a subscriber identification module (SIM);
    wherein the energy source comprises an internal battery, wherein the internal battery is connected with the button and the wireless processor, and
    an external attachment element to attach the housing to the host device, wherein the external attachment element comprises one or more of the following: a magnet, a clip, a hook and loop fastener, or an adhesive;
    wherein, in response to energizing the host device via the button, the wireless processor is configured to transition the host device to a first state upon connecting the host device to the mobile cellular network via a programmable sequence or a programmable pattern of presses of the button and provide a first indication via a light indicator for the first state, wherein the wireless processor is configured to transition the host device to a second state upon disconnecting the host device from the mobile cellular network.

2. The wireless converter of claim 1, wherein the wireless processor is configured to program the host device.

3. A wireless apparatus for converting a host device to a wireless-capable device comprising:
    a housing, wherein the housing is external to and separate from the host device;
    a button having a connection and an actuating assembly for the button, said connection being configured to connect to a switch of the host device, said button having an outer surface to user interaction, wherein the actuating assembly is disposed inside the housing and comprises a motor and a gear assembly, wherein the actuating assembly is further connected to an energy source, wherein the motor actuates movements of the button;
    a wireless processor, being within the housing and being external to the host device, having a wireless antenna for a mobile cellular network and being preconfigured with a preset wireless identifier for registering with the mobile cellular network, wherein the preset wireless identifier comprises a subscriber identification module (SIM);
    wherein the energy source comprises an internal battery connected with the button and the wireless processor, and
    an external attachment element to attach the housing to the host device, wherein the external attachment element comprises one or more of the following: a magnet, a clip, a hook and loop fastener, or an adhesive;
    wherein, in response to energizing the host device via the button, the wireless processor is configured to transition the host device to a first state upon connecting the host device to the mobile cellular network via a programmable sequence or a programmable pattern of presses of the button and provide a first indication via a light indicator for the first state, wherein the wireless processor is configured to transition the host device to a second state upon disconnecting the host device from the mobile cellular network.

4. The wireless apparatus of claim 3, wherein the mobile device is configured to program the host device via a connection with the wireless processor.

5. The wireless apparatus of claim 3, wherein the wireless processor is configured to program the host device.

6. A system for converting a host device to a wireless-capable device comprising:
    a housing, wherein the housing is external to and separate from the host device;
    a button having a connection and an actuating assembly for the button, said connection being configured to connect to a switch of the host device, said button having an outer surface to user interaction, wherein the actuating assembly is disposed inside the housing and comprises a motor and a gear assembly, wherein the actuating assembly is further connected to an energy source, wherein the motor actuates movements of the button;
    a wireless processor, being within the housing and being external to the host device, having a wireless antenna for a mobile cellular network and being preconfigured with a preset wireless identifier for registering with the mobile cellular network wherein the preset wireless identifier comprises a subscriber identification module (SIM);

wherein the energy source comprises an internal battery, wherein the internal battery is connected with the button and the wireless processor, and an external attachment element to attach the housing to the host device, wherein the external attachment element comprises one or more of the following: a magnet, a clip, a hook and loop fastener, or an adhesive;

wherein, in response to energizing the host device via the button, the wireless processor is configured to transition the host device to a first state upon connecting the host device to the mobile cellular network via a programmable sequence or a programmable pattern of presses of the button and provide a first indication via a light indicator for the first state, wherein the wireless processor is configured to transition the host device to a second state upon disconnecting the host device from the mobile cellular network.

7. The system of claim 6, wherein the network device comprises a network server of a mobile cellular communication network or a user mobile device.

8. The system of claim 6, wherein the wireless processor is configured to program the host device.

* * * * *